United States Patent [19]

Jass

[11] Patent Number: 4,941,043

[45] Date of Patent: Jul. 10, 1990

[54] METHOD FOR REDUCING BLOCKING ARTIFACTS IN VIDEO SCENE CODING WITH DISCRETE COSINE TRANSFORMATION (DCT) AT A LOW DATA RATE

[75] Inventor: Wieland Jass, Baldham, Fed. Rep. of Germany

[73] Assignee: Siemens Aktiengesellschaft, Berlin and Munich, Fed. Rep. of Germany

[21] Appl. No.: 362,700

[22] Filed: Jun. 7, 1989

[30] Foreign Application Priority Data

Jun. 14, 1988 [DE] Fed. Rep. of Germany ....... 3820266

[51] Int. Cl.$^5$ .............................................. H04N 7/133
[52] U.S. Cl. ..................................... 358/133; 358/136
[58] Field of Search ........................ 358/133, 135, 136

[56] References Cited

U.S. PATENT DOCUMENTS

| | | | |
|---|---|---|---|
| 4,814,871 | 3/1989 | Keeson | 358/133 |
| 4,831,440 | 5/1989 | Borgers | 358/133 |
| 4,833,535 | 5/1989 | Ozeki | 358/133 |
| 4,837,724 | 6/1989 | Borgers | 358/133 |

FOREIGN PATENT DOCUMENTS 3605032 8/1987 Fed. Rep. of Germany .

OTHER PUBLICATIONS

Kato, "A Motion Picture Coding Algorithm Using Adaptive DCT Encoding Based on Coefficient Power Distribution Classification", IEEE Journal on Selected Areas in Communications, vol. SAC-5, No. 7, Aug. 1987.

*Primary Examiner*—Howard W. Britton
*Attorney, Agent, or Firm*—Hill, Van Santen, Steadman & Simpson

[57] ABSTRACT

A method for reducing what are referred to as blocking artifacts in a video scene coding with discrete cosine transformation (DCT) at a low data rate is provided in a video signal transmission system, having a transmit-side video signal input to which a video signal to be transmitted is supplied. A transmit-side coder transmits frequency limitation parameters allocated to the individual blocks of the video signal to be divided into a plurality of blocks at a receive-side decoder, via a transmission channel, together with a block-associated video sub-signal that is coded by the coder. The frequency limitation parameters are used at the receive side to control a block filter function at the output of the decoder that outputs a decoded video signal, controlling this for postprocessing of the decoded video signal for the purpose of reducing the blocking artifacts.

6 Claims, 9 Drawing Sheets

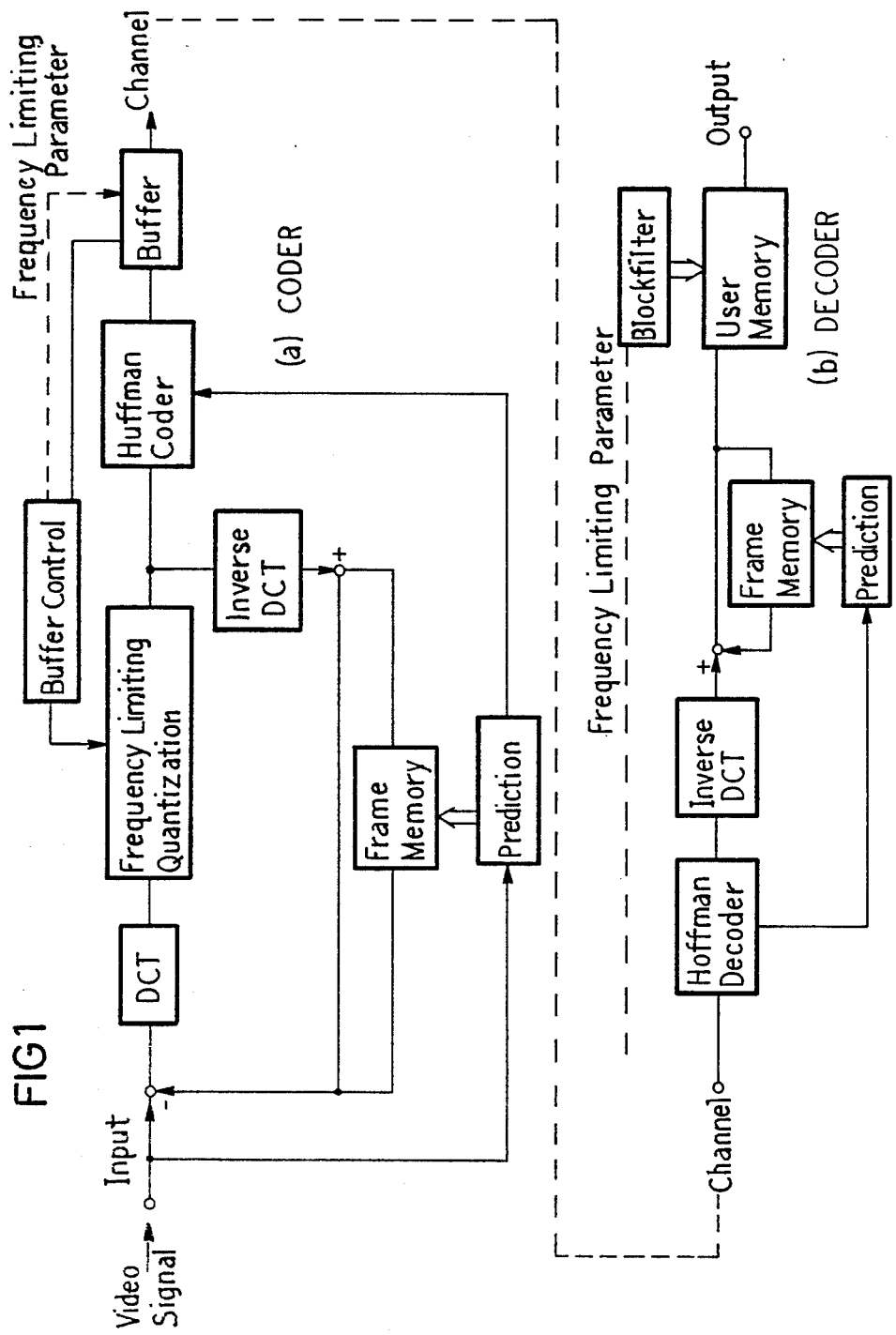

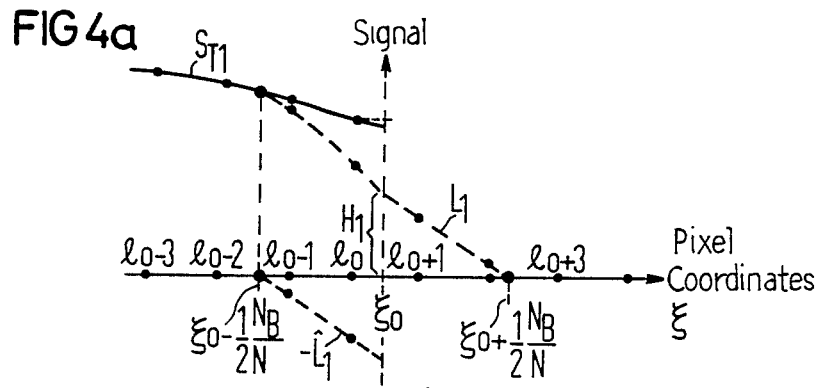
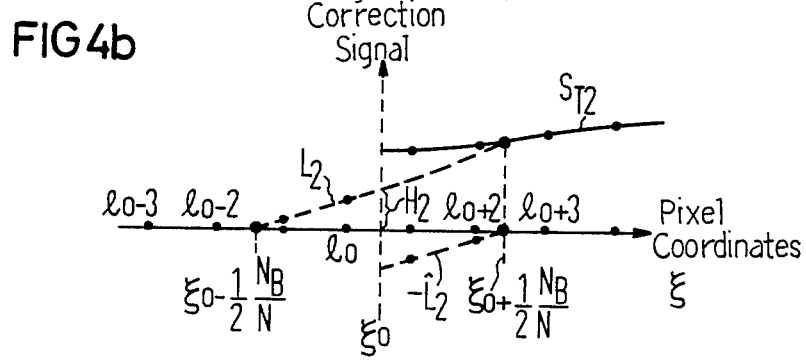
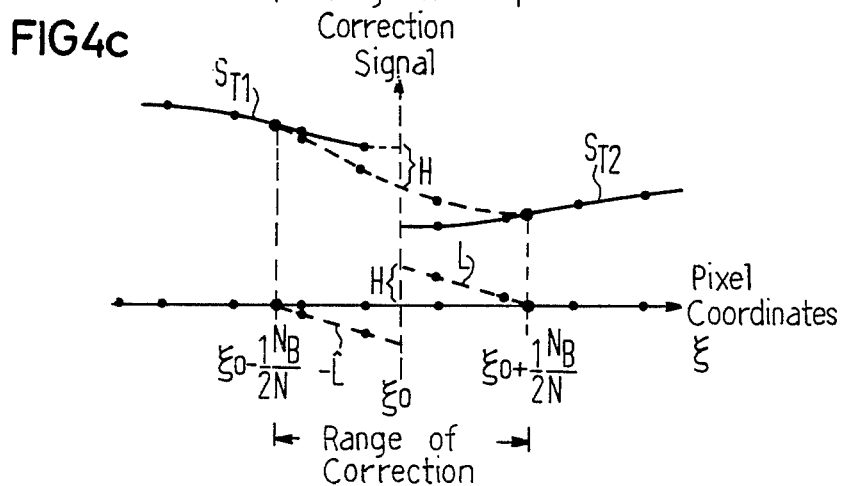

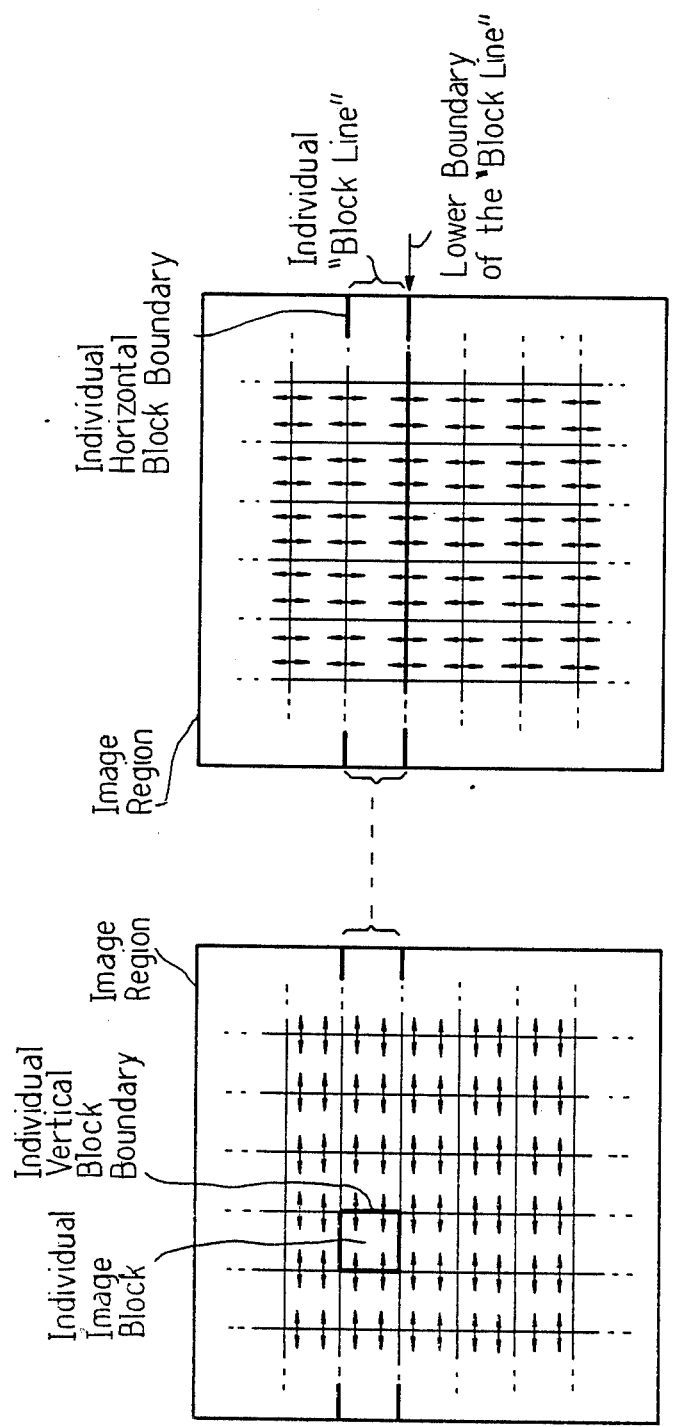

METHOD FOR REDUCING BLOCKING ARTIFACTS IN VIDEO SCENE CODING WITH DISCRETE COSINE TRANSFORMATION (DCT) AT A LOW DATA RATE

BACKGROUND OF THE INVENTION

The present invention is directed to a method for reducing what are referred to as blocking artifacts with "discrete cosine transformation" (DCT) at a low data rate.

Discrete cosine transformation is employed in the coding event in a specific type of video scene coder. The image region is divided into adjacent, non-overlapping sub-regions, namely into "blocks" in which discrete cosine transformation is respectively employed. In coders for a low data rate, for example 64 kbit/s, various methods are employed in order to limit the rate in the course of the coding. Included among typical procedures is to limit the plurality of coefficient in the DCT transformation region for the individual blocks, i.e. to under-take a "frequency limitation". What are referred to as blocking artifacts can occur in the pictures as a consequence of these frequency limitations. The block structure thereby becomes a visual disturbance.

A filtering of the images in the proximity of the block boundaries with a smoothing filter has already been proposed, see, for example, H. C. Reeve III, Jae S. Lim, "Reduction of Blocking Effect in Image Coding", in Prc. ICASSP 1983 (Boston, Mass.), pages 1212 through 1215. A disadvantage of this filtering is that there is a visible unsharpening of the images in these regions.

The publication of B. Ramamurthi, A. Gersho, "Nonlinear Space-Variant Postprocessing of Block Coded Images", IEEE Trans. Acoust., Speech Signal Processing, Vol. ASSP-34, pages 1258 through 1268 has proposed a relatively complicated, unspecific postprocessing of the images. No information deriving from the coding event such as, for example, the frequency limitations, is exploited.

SUMMARY OF THE INVENTION

The object of the present invention is to create a method of the species initially cited that effectively enables an improvement of the quality in a simple fashion given a low data rate of transmitted images by reducing the blocking artifacts.

In accord with the invention, the information about the frequency limitations in the blocks employed in the coding event, namely what are referred to as frequency limitation parameters, are used. In a preferred embodiment of the invention, one-dimensional, linear function segments are superimposed on the picture signal in line direction or, respectively, column direction in correction regions that overlap the blocks.

The "height" of the linear function segments is only dependent on the picture signals in the respective edge pixels of neighboring blocks. The "width" of the linear function segments is respectively defined by the frequency limitation parameters in neighboring blocks. In the shared correction region of two neighboring blocks, the "sharper" of the two blocks defines this width.

The invention particularly offers advantages given an application to video scene coding using a low data rate, for example 64 kbit/s, wherein DCT (discrete cosine transformation) is employed. The image region is divided into non-overlapping sub-regions, or "blocks", which, for example, have a size of 16×16 pixels or 8×8 pixels. DCT is respectively applied to these blocks in the coding event.

BRIEF DESCRIPTION OF THE DRAWINGS

The invention shall be set forth in detail below with reference to a plurality of figures, in which:

FIGS. 1a and 1b show a block circuit diagram of a video signal transformation system having a transmission side DCT/DPCM hybrid coder with which frequency limitation parameters per image block are transmitted, together with the appertaining video sub-signal via the channel, to a receiver-side decoder in which the frequency limitation parameters serve the purpose of controlling the block filter function within the framework of a postprocessing of a decoded video signal;

FIGS. 4a through 4c show various diagrams related to the approximative construction of low-pass signal parts of frequency-limited signals in a correction region and also shows additive superimpositions thereof;

FIGS. 5a, 5b show schematic illustrations of a "block filtering" in correction regions around the image block boundaries.

DESCRIPTION OF THE PREFERRED EMBODIMENT

As already set forth, FIGS. 1a, 1b show a general circuit diagram of a DCT/DPCM hybrid coder. The figure shows a possible diagram as to how the method—referred to below as "block filtering"—can be applied in such a coder. "Frequency limitation parameters" allocated to the individual blocks are sent from the coder to the decoder. At the decoder, these parameters serve the purpose of controlling the "block filtering" at the decoder output, i.e. following the DPCM loop. In the example, thus, the method is applied as postprocessing of the decoded images.

Another possibility, for example, comprises applying the "block filtering" at the coder and the decoder within the respective DPCM loop. Here, too, the method is controlled by frequency limitation parameters that must likewise be transmitted from the coder to the decoder. In this second type of application, potentially additional parameters are transmitted that contain the information as to whether the "block filtering" was applied or not in the correction regions at the individual blocks.

In scene coding with DCT transformation, every image is divided into a plurality of adjacent, quadratic block regions of a fixed size, for example 8×8 or 16×16 pixels. The DCTs and inverse DCTs occurring in the processing of the images are respectively applied in and of themselves to each block.

Figure 2A:
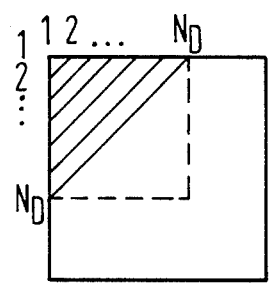
FIG. 2a shows a schematic illustration of an image block in which a region for the transmitted DCT coefficient is entered in the DCT transformation region of the image block.
Figure 2B:
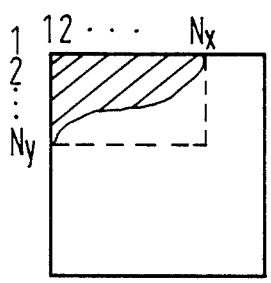
FIG. 2b shows a schematic illustration according to FIG. 2a in which "general" region of DCT coefficient is indicated.

In order to keep the bit rate to be transmitted limited in low rate coders, a typical procedure is to limit the number of coefficients to be transmitted in the DCT transformation region of a block, i.e. to undertake a frequency limitation that is generally dependent on the block content. FIG. 2a shows a region for the transmitted coefficient in the DCT transformation region of an image block that is characterized by the number $N_D$ of the "diagonal" corresponding to the highest transmitted frequency. FIG. 2b shows a general region. In both instances, appertaining frequency limitation parameters, i.e. coefficient numbers $N_x$, $N_y$, corresponding to the highest occurring frequencies can be recited in horizontal and in vertical direction. In the former instance, $N_x = N_y = N_D$ applies.

The assumption is now made that this frequency limitation in image blocks is the cause of possible, visible "blocking" artifacts, i.e. of making block boundaries visible. It is not important for the cause of creation that the frequency limitation may potentially be different in neighboring blocks; rather, only the fact of the frequency limitation itself is important. The strength of the disturbing effect, however, is dependent on the degree of frequency limitation and is also taken into consideration in the block filtering method.

It is further assumed for the situation of the "blocking" effects that the frequency limitation is adequately described by the two separate limitations in the horizontal and in the vertical direction, this being indicated in FIGS. 2a, 2b by the broken-line, rectangular limitations. Accordingly, the "block filter" operation in the image region is also separated into two operations to be executed successively that are executed only within the image lines, i.e. horizontally, or, respectively, only within the image columns, i.e. vertically.

Figure 3A:
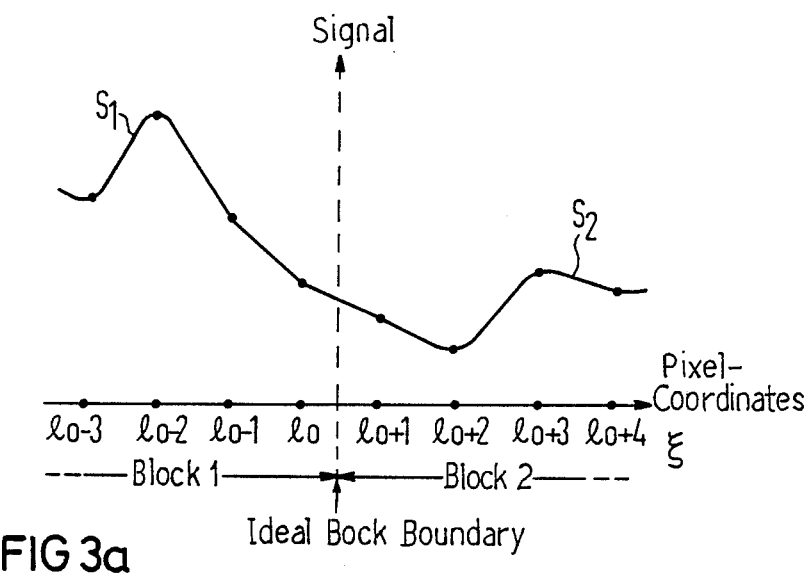
FIGS. 3a through 3d show various diagrams of what is referred to as a one-dimensional signal in the image region in the zone between two neighboring image blocks.

The effect that a frequency limitation in horizontal or vertical direction in the DCT transformation region in the image region has for the one-dimensional signal within an image line or image column is shown in FIG. 3a. A pixel coordinate $\xi$ is entered at the abscissa in the various figures. The spacing between two consecutive pixels should = 1. The signals are primarily represented by values in the discrete pixel grid.

FIG. 3a shows the original signals $S_1$, $S_2$ in the region of two neighboring blocks, Block 1, Block 2. Each of the two signals should be formerly limited to the appertaining block region:

$S_1(\xi) = 0$ for $\xi$ outside of Block 1, $S_2(\xi) = 0$ for $\xi$ outside of Block 2     (1)

so that the entire original signal $S(\xi)$ in the region of the two blocks can be written as the sum $S(\xi) = S_1(\xi) + S_2(\xi)$     (2)

let the center between the two last pixel grid points that still respectively belong to a block be referred to as the ideal block boundary between Block 1 and Block 2.

It can be demonstrated that a frequency limitation in the DCT region for one block means a non-homogenous operation in the image region. This operation can be formally resolved into the following sub-operations: The Signal 1. is mirrored at the ideal block boundaries,
2. is periodically continued with the period = 2 $N_B$, where $N_B$ = Block width (i.e., for example, 8 or 16),
3. is homogeneously convoluted with a low-pass filter function $F((N/N_B)\xi)$, where N is a (3) frequency limitation parameter,
4. is finally limited to the original block region, i.e. = 0 is set outside the original block region.

Figure 3B:
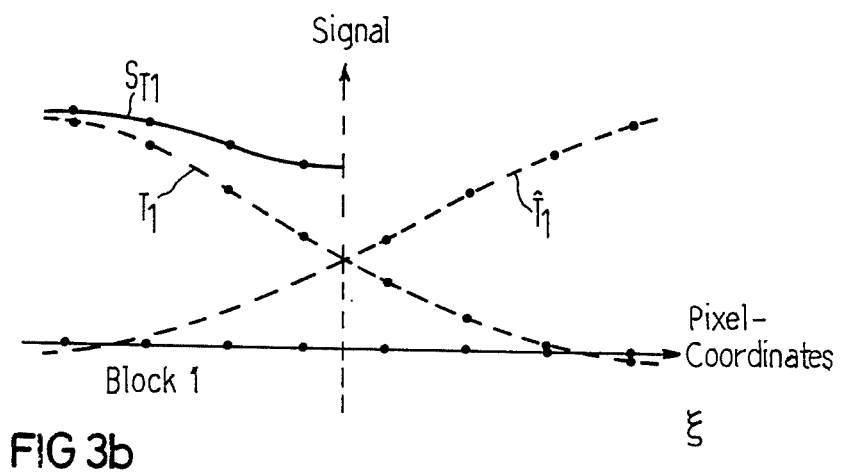
Figure 3C:
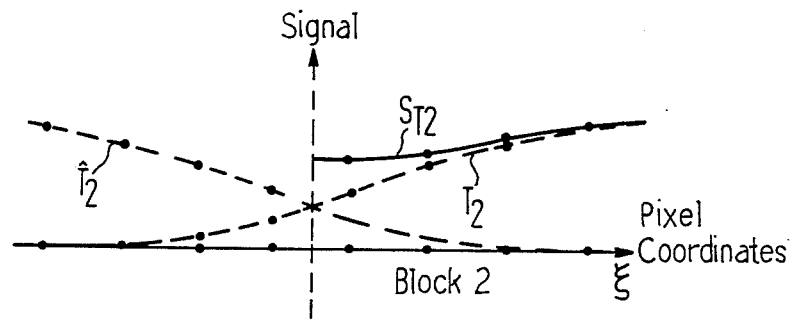

All four sub-operations are linear in the sense of the superposition. What is considered critical for the "blocking" effect is that the signal in the region under consideration is first mirrored at the ideal block boundary between Block 1 and Block 2 and is subsequently homogeneously low-pass filtered. $S_{T1}(\xi)$ or, respectively, $S_{T2}(\xi)$ are the resulting signals in Block 1 or, respectively, Block 2. Each of the two resulting signals can then be written within the appertaining block as the sum of a low-pass filtered function and of the same function mirrored at the ideal block boundary;

$S_{T1} = T_1 + \hat{T}_1$, limited to Block 1, See FIG. 3b;

$S_{T2} = T_2 + \hat{T}_2$, limited to Block 2, See FIG. 3c     (4)

A homogeneous Operation wherein no "blocking" effects would be visible would exist, for example, if the same frequency limitation were to be applied in both blocks and if the resulting signal were $T_1 + T_2$, whereby $T_1$ and $T_2$ would not be respectively limited to the appertaining block.

Given the DCT coders under consideration, a frequency limitation is generally carried out in the image blocks, so that the frequency limitations in neighboring blocks are not necessarily identical. Let the frequency limitation parameters be $N_1$ for Block 1 and $N_2$ for Block 2 and let $N = Max(N_1, N_2)$     (5)

be the greater of the two parameters. If a frequency limitation operation—expressed by the above four sub-operations (3)—were to be subsequently applied to the two resulting signals $S_{T1}$ in Block 1 and $S_{T2}$ in Block 2 once again but now with the same frequency limitation parameters N for both blocks, then, as may be easily seen, the same resulting signals $S_{T1}$ in Block 1 and $S_{T2}$ in Block 2 would again derive.

A further operation that likewise does not modify the two resulting signals $S_{T1}$ and $S_{T2}$ and that simultaneously again supplies a resolution of each of the two signals into a homogeneous low-pass filtered signal and into a signal mirrored relative thereto at the ideal block boundary can be defined in the following way:

Each of the two signals $S_{T1}$, $S_{T2}$ can be conceived of as being a continuous function, whereby the interpolated values are generated by the continuous low-pass filter function $F((N/N_B)\cdot\xi)$ in sub-operation "3." of (3).

Figure 3D:
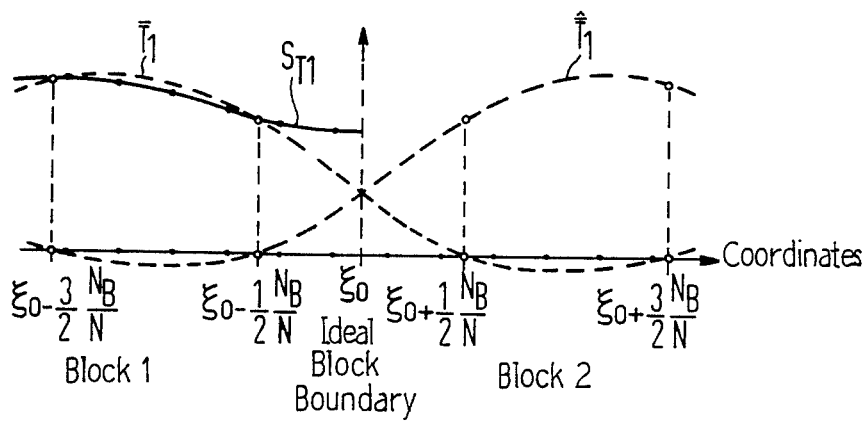

These continuous signals are sampled in a grid that is adapted to the frequency limitation:

The grid points at ... , $\xi O - \frac{3}{2}\frac{N_B}{N}, \xi O - \frac{1}{2}\frac{N_B}{N}, \xi O + \frac{1}{2}\frac{N_B}{N}, \xi O + \frac{3}{2}\frac{N_B}{N}, \ldots,$ lie symmetrically relative to the ideal block boundary at $\xi = \xi O$ as indicated by ∘ ∘ ∘ in FIG. 3d. The spacing is $N_B/N$.

FIG. 3d shows the situation for the signal $S_{T1}$. The sampling of $S_{T2}$ should ensue in the same grid.

When, given these signal functions sampled in such fashion, the above four sub-operations (3) are again executed, whereby sub-operation "3." is again assumed to be interpolating, then the two resultant signals $S_{T1}$, $S_{T2}$ are again produced. This can be easily demonstrated with the assistance of the known sampling theorem.

An additive resolution for each of the resultant signals into a respective, low-pass filtered signal and the same signal mirrored at the ideal block boundary likewise derives in this operation:

$S_{T1} = \overline{T}_1 + \hat{\overline{T}}_1$, limited to Block 1, see FIG. 3d;

$S_{T2} = \overline{T}_2 + \hat{\overline{T}}_2$, limited to Block 2. (7)

In this case, the low-pass filtered signal $\overline{T}_1$ or, respectively, $\overline{T}_2$ at the supporting locations of the sampling grid described in (6) within the respectively appertaining block proceeds through the corresponding samples of $S_{T1}$ or, respectively, $S_{T2}$ and proceeds through supporting values = 0 outside of the appertaining block.

"Block Filter" Method

As set forth in general terms above, the picture signals—after they have been frequency-limited in the DCT transformation region—are composed, per image block, of a low-pass signal and a respectively appertaining low-pass signal mirrored at a block boundary that are both respectively limited to the image block.

The idea of the invention is constructing approximately only the low-pass signal parts without the mirrored low-pass signal parts from the frequency limited signals present in every image block, constructing these in respective correction regions that are block-overlapping, and additively superimposing them.

In accord with the explanations provided above, the "block filter" should thereby be subdivided into sub-operations that are respectively one-dimensionally executed within the image lines or, respectively, within the image columns.

In a preferred embodiment of the method, the greater of the frequency limitation parameters allocated to every individual block is taken as common frequency limitation parameter N for controlling the "block filtering" in the correction region of two neighboring image blocks, see (5).

In the preferred embodiment, respective low-pass signal parts that proceed through sampling points of the existing picture signal that is conceived of as being continuous in accord with the comments provided above, namely in a scan grid as described in (6) are approximatively constructed and superimposed within a respective image line or image column in a one-dimensional sub-operation in a correction region.

In the preferred embodiment, a respective one-dimensional sub-operation in a correction region within an image line or image column takes place by additive superimposition of the existing image signals with linear function segments.

A further description and explanation of the preferred exemplary embodiments shall be provided FIG. 4.

As described above, let $S_{T1}(\xi)$ and $S_{T2}(\xi)$ be the one-dimensional, frequency-limited signals present in an image line or image column in appertaining image blocks, Block 1 and Block 2. The low-pass signals $\overline{T}_1$ and $\overline{T}_2$, are to be constructed and superimposed approximatively in a correction region X from $S_{T1}$ and $S_{T2}$, sfp. (6), (7), FIG. 3d.

The region between the sampling points of the imaginary sampling grid as defined in (6) lying closest to the ideal boundary at $\xi = \xi 0$ on both sides is taken as correction region K (N), i.e. the interval $$K(N) = \left( \xi_0 - \frac{1}{2} \frac{N_B}{N}, \xi_0 + \frac{1}{2} \frac{N_B}{N} \right), N_B = \text{block} \quad (8)$$

width, see (3).

The construction of a low-pass signal part shall be provided with reference to the example of $T_1$ and is to be analogously transferred to $T_2$. In that part of the correction region that lies outside of Block 1, $T_1$ is approximated by a linear function segment $L_1$;

$$L_1(\xi) = \quad (9')$$

$$\begin{cases} H_1 - 2H_1 \frac{N}{N_B} (\xi - \xi_0), \text{ for } \xi \in \left( \xi_0, \xi_0 + \frac{1}{2} \frac{N_B}{N} \right) \\ o \text{ otherwise} \end{cases}$$

with $H_1 = \frac{1}{2} S_{T1}(l_0)$, see FIG. 4a.

The selection of $H_1$ can be substantiated as follows: According to (7), $S_{T1}$ is the sum of the signal parts $\overline{T}_1$ and $\hat{\overline{T}}_1$ that are mirrored relative to one another at $\xi = \xi_0$. $\overline{T}_1(\xi_0) = \frac{1}{2} S_{T1}(\xi_0)$ therefore applies. For the same reason, $S_{T1}$ has a horizontal tangent in $\xi = \xi_0$. $S_{T1}(l_0)$ therefore applies, i.e. the value of $S_{T1}$ in the pixel supporting point lying closest to the ideal block boundary is a good approximation for $S_{T1}(\xi_0)$.

In that part of the correction region that lies within Block 1, the linear function segment $\hat{L}_1$ mirrored relative to $L_1$ at $\xi = \xi_0$ is a corresponding approximation for $\hat{\overline{T}}_1$. In order to thus obtain an approximation of $\overline{T}_1$ in this region, $\hat{L}_1$ is to be subtracted from $T_{T1}$ there because of (7). Overall, the signal $\overline{S}_{T1}$ that is constructed from $S_{T1}$ in the entire correction region and that approximates $T_1$ is:

$$\overline{S}_{T1}(\xi) = S_{T1}(\xi) - \hat{L}_1(\xi) + L(\xi), \quad (9),$$

$\xi \in$ correction region, see FIG. 4a.

An entirely corresponding construction is applied at $S_{T2}$ and yields $$\overline{S}_{T2}(\xi) = S_{T2}(\xi) - \hat{L}_2(\xi) + L(\xi), \quad (10),$$

$\xi \in$ correction region, see FIG. 4b, with $$L_2(\xi) = \begin{cases} H_2 - 2H_2 \frac{N}{N_B} (\xi - \xi_0), \text{ for} \\ \xi \in \left( \xi_0, \xi_0 + \frac{1}{2} \frac{N_B}{N} \right) \end{cases} \quad (10')$$

$$H_2 = \frac{1}{2} S_{T2}(l_0 + 1).,$$

$L_2(\xi)$ is the linear function segment mirrored at $\xi = \xi_0$ relative to $\hat{L}_2(\xi)$.

The additive superposition of the two constructed signals $\overline{S}_{T1}$ and $\overline{S}_{T2}$ in the overall correction region, i.e. the result $\overline{S}_T$ of the "block filter" sub-operation is thus:

$$S_T(\xi) = S_{T1}(\xi) + S_{T2}(\xi) \quad (11)$$
$$= S_T(\xi) + L(\xi) - \hat{L}(\xi), \text{ see FIG. 4c,}$$

$\xi \epsilon$ correction region K(N), with $S_T(\xi) = S_{T1}(\xi) + S_{T2}(\xi)$:

for the picture signal present before the

"block filter" suboperation $L(\xi) = L_1(\xi) - L_2(\xi) =$ $$\begin{cases} H - 2H\dfrac{N}{N_B}(\xi - \xi_0), & \text{for } \xi\epsilon\left(\xi_0, \xi_0 + \dfrac{1}{2}\dfrac{N_B}{N}\right), \\ O & \text{otherwise} \end{cases}$$

$$H = H_1 - H_2 = \tfrac{1}{2}[S_T(l_0) - S_T(l_0+1)] \quad (11')$$

$\hat{L}(\xi)$ is the linear function segment mirrored at $\xi = \xi_0$ relative to $L(\xi)$.

The "block filter" sub-operation is thus executed by superposition of the previously existing picture signal $S_T$ with linear function segments $L$ and $-\hat{L}$ whose height H is the half of only the difference of the pixel supporting values of $S_T$ that are immediately adjacent to the ideal block boundary.

Numerical Calculation of the Linear Function Segments

For the practical application, the linear function segment L defined in (11′) must be calculated in the pixel supporting points that lie in the correction region. The calculation can ensue iteratively via a supporting value $H_0$ and via an increment $\Delta$ with a running index m that runs from 1 through $m_G$:

$$L(l_0 + m) = \begin{cases} H_0 - m\Delta, & \text{for } m = 1, \ldots, m_G, \text{ for } m_G \geq 1 \\ O & \text{otherwise} \end{cases}$$

with $$\Delta = [S_T(l_0) - S_T(l_0+1)]N/N_B \quad (12')$$

$$H_0 = \tfrac{1}{2}[S_T(l_0) - S_T(l_0+1) + \Delta] \quad (12'')$$

$$m_G = \text{int}[\tfrac{1}{2}(1 + N_B/N)] \quad (12''')$$

Since $N_B$ is generally a power of 2, for example $N_B = 8$ or $= 16$, the division by $N_B$ in (12′) is a simple bit shift operation. Since N also assumes only the relatively few values $1, \ldots, N_B$, the division by N, for example, can be expressed via table as a multiplication.

Flow Diagram of the "Block Filtering" in the Preferred Embodiment

Figure 6:
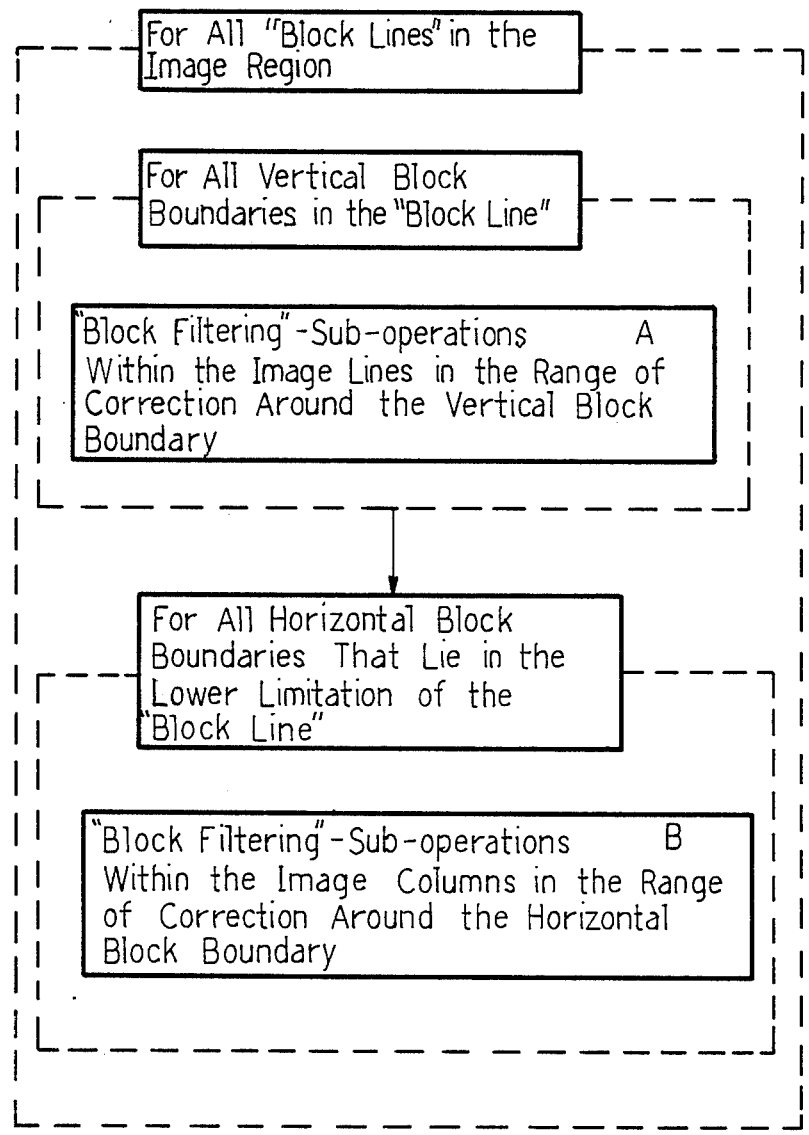
FIGS. 6, 6a and 6b show a survey flow chart or, respectively, partial flow charts for explaining the method of the invention.
Figure 6A:
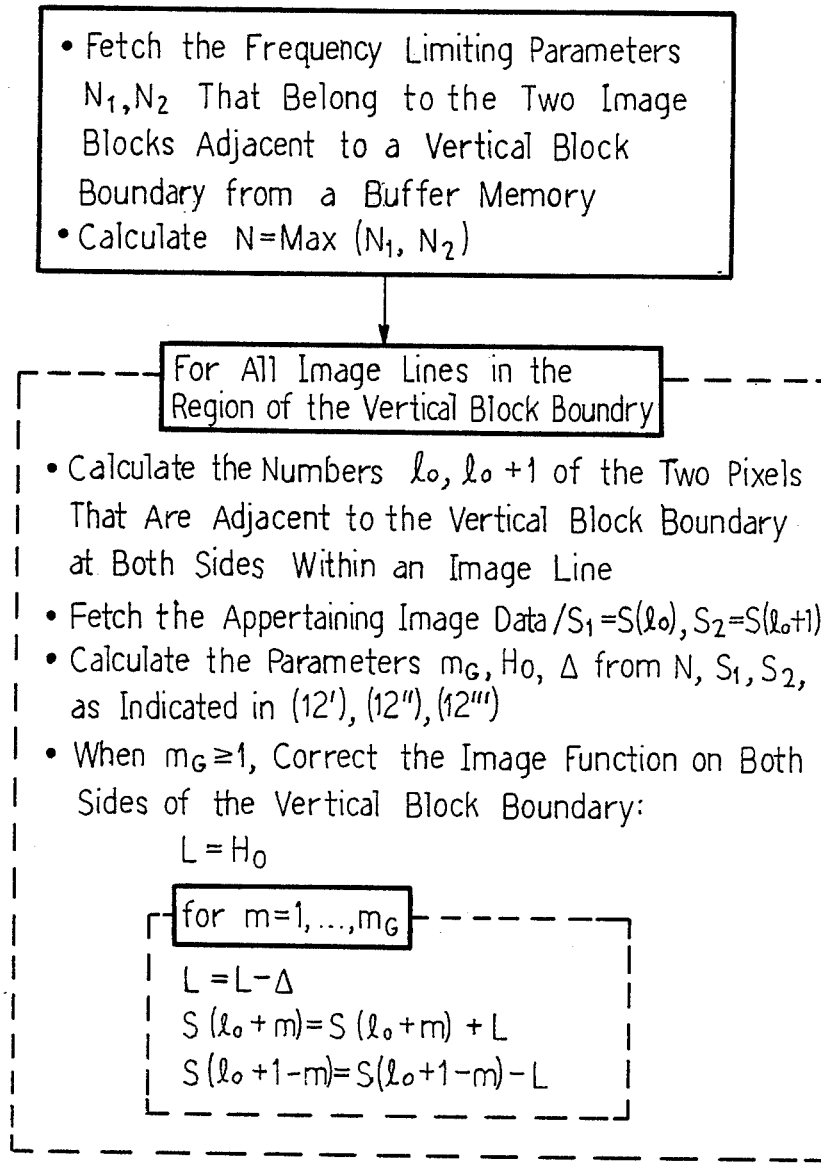
Figure 6B:
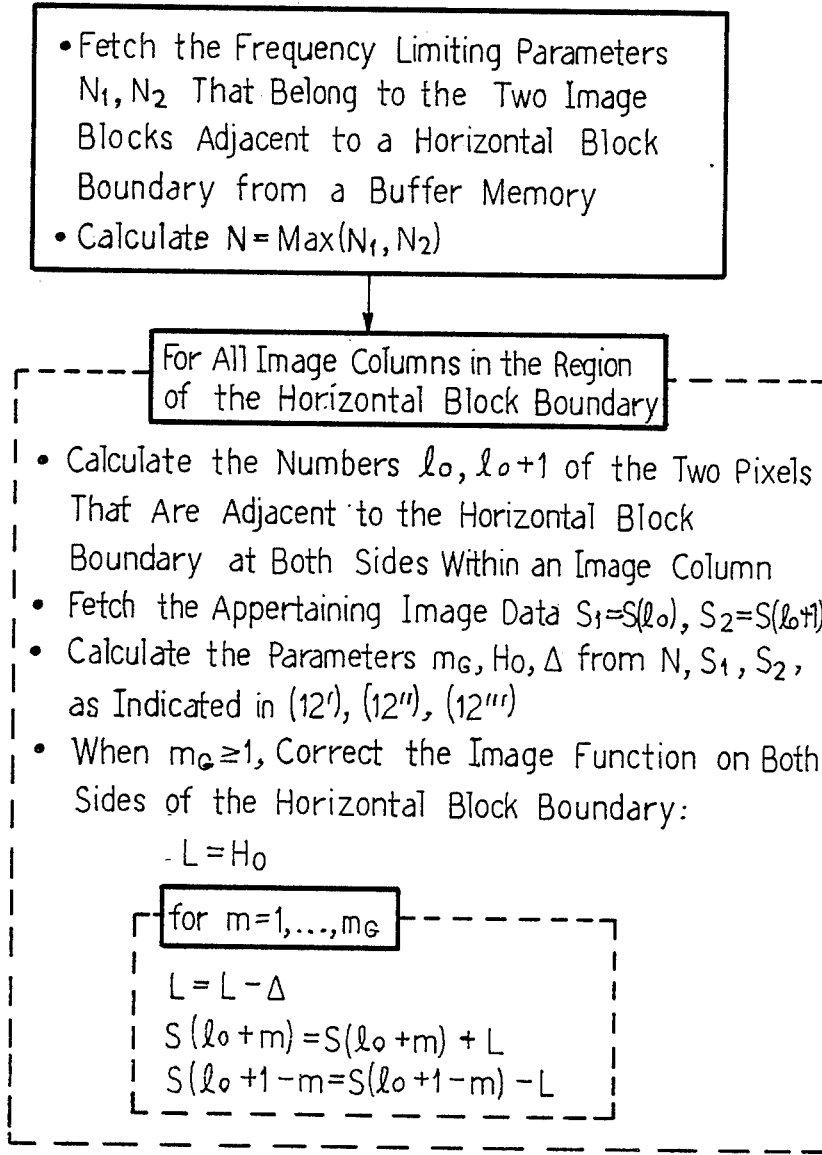

The flowchart of FIG. 6 makes reference to FIG. 5. FIG. 5 shows a subdivision of the image region into subregions that are respectively processed in sub-operations of the "block filtering". As indicated in FIG. 5, a series of image blocks that are adjacent to one another in the direction of the picture line are referred to as a "block line".

The results of sub-operations are always written back into the same memory. The output image data and the image data of intermediate results are all referenced with S (pixel number) in the flow diagram independently of the status of the processing.

In the preferred embodiment, a correction region in a sub-operation never extends beyond the middle of an image block. It can therefore be derived from the flow diagram that a parallelization of sub-operations that do not disturb one another is possible. Those are the respective suboperations operations at the vertical block boundaries in a "block line", see FIG. 5a, and the sub-operations at the horizontal block boundaries that lie within the lower limitation of a "block line", see FIG. 5b.

It will be understood that variations and modifications may be effected without departing from the spirit and scope of the novel concepts of the present invention.

It is claimed:

1. A method for reducing blocking artifacts in a video scene coding with discrete cosine transformation (DCT) at a low data rate, characterized by the steps of
   in a video signal transmission system (FIG. 1a, FIG. 1b) having a transmission-side video signal input to which a video signal to be transmitted is supplied, transmitting, via a transmit-side coder, the frequency limitation parameters allocated to the individual blocks of the video signal to be divided into a plurality of blocks, transmitting these to a receive-side decoder via a transmission channel together with a block-associated video sub-signal that is coded by the coder; and
   employing the frequency limitation parameters at the receiver-side for the purpose of controlling a block filter function at the output of the decoder that outputs a decoded video signal, for postprocessing of the decoded video signal for the purpose of reducing the blocking artifacts.

2. A method for reducing blocking artifacts in a video scene coding with discrete cosine transformation (DCT) at a low data rate, characterized by the steps of
   in a video signal transmission system having a transmit-side video signal input to which a video signal to be transmitted is supplied, connecting a transmit-side coder and a receiver-side decoder to said transmit-side coder via a transmission channel, said transmit-side coder having an output that outputs a decoded video signal executing a block filter function in each of said coder and decoder within the DPCM loop of the coder or decoder, for the purpose of reducing the blocking artifacts; and
   defining frequency limitation parameters in the coder and in the decoder, these being employed for the purpose of controlling the block filter function.

3. The method according to claim 2, characterized by the step of transmitting additional parameters via the transmission channel, said additional parameters containing information as to whether the block filter function is to be applied or is not to be applied in prescribed correction regions of individual blocks of the video signal to be divided into a plurality of blocks.

4. The method according to one of the preceding claims, characterized by the step, for the control of the block filter function in the correction region of two neighboring image blocks, of employing the respectively greater of the frequency limitation parameters allocated to each individual image block ($N_1$ for image Block 1; $N_2$ for image Block 2) as a common frequency limitation parameter N, namely $N=Max\ (N_1,\ N_2)$.

5. The method according to one of claims 1-3, characterized by the step of superimposing one-dimensional linear function segments on the video signal in line direction or, respectively, column direction of the image in correction regions that overlap the image blocks.

6. The method according to one of claims 1-3, characterized by the step only the low-pass signal parts without the mirrored low-pass signal parts are approximately constructed and additively superimposed from the frequency-limited signals existing in every image block in respective correction regions that are block-overlapping.

* * * * *